United States Patent
George et al.

(10) Patent No.: US 11,652,923 B2
(45) Date of Patent: *May 16, 2023

(54) INTERACTION BASED SUITABLE CHANNEL SELECTION FOR QUEUED CUSTOMERS

(71) Applicant: Avaya Inc., Santa Clara, CA (US)

(72) Inventors: Jibin George, Pune (IN); Salil Dhawan, Pune (IN); Sandeep Goynar, Pune (IN); Harsimran Jeet Singh, Pune (IN)

(73) Assignee: Avaya Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,594

(22) Filed: Oct. 28, 2021

(65) Prior Publication Data

US 2022/0053094 A1 Feb. 17, 2022

Related U.S. Application Data

(63) Continuation of application No. 16/398,381, filed on Apr. 30, 2019, now Pat. No. 11,212,390.

(51) Int. Cl.
*H04M 3/523* (2006.01)
*H04M 3/51* (2006.01)
*H04M 3/53* (2006.01)

(52) U.S. Cl.
CPC ....... *H04M 3/5233* (2013.01); *H04M 3/5175* (2013.01); *H04M 3/5238* (2013.01); *H04M 3/5315* (2013.01)

(58) Field of Classification Search
CPC combination set(s) only.
See application file for complete search history.

(56) References Cited

U.S. PATENT DOCUMENTS

| | | | |
|---|---|---|---|
| 6,704,409 B1 * | 3/2004 | Dilip | H04M 3/523 379/265.09 |
| 8,234,141 B1 | 7/2012 | Flockhart et al. | |
| 8,634,543 B2 | 1/2014 | Flockhart et al. | |
| 9,674,360 B2 | 6/2017 | Hartman et al. | |
| 9,762,733 B1 | 9/2017 | Ramanujaiaha et al. | |

(Continued)

OTHER PUBLICATIONS

Phung Hoang Joseph Nguyen; Office Action; U.S. Appl. No. 16/398,381; dated Mar. 8, 2021; United States Patent and Trademark Office; Alexandria, VA.

(Continued)

*Primary Examiner* — Phung-Hoang J Nguyen
(74) *Attorney, Agent, or Firm* — Stevens & Showalter LLP

(57) ABSTRACT

Assigning an appropriate channel in an omni-channel contact center environment includes receiving, by a computer of the contact center, an incoming contact via a first communication channel, the incoming contact assignable to a plurality of available communication channels; queuing, by the computer, the incoming contact in a first queue associated with the first communication channel; determining, by the computer, a preferable communication channel from among the plurality of communication channels and the first communication channel; and when the preferable communication channel is one of the plurality of communication channels, determining whether to assign the incoming contact to the preferable communication channel.

20 Claims, 3 Drawing Sheets

(56) References Cited

U.S. PATENT DOCUMENTS

| | | | |
|---|---|---|---|
| 2006/0013254 A1* | 1/2006 | Shmueli | H04M 3/436 |
| | | | 370/466 |
| 2011/0179126 A1* | 7/2011 | Wetherell | H04W 72/048 |
| | | | 709/206 |
| 2012/0190333 A1* | 7/2012 | Portman | G06Q 20/00 |
| | | | 455/411 |
| 2014/0019886 A1 | 1/2014 | Kannan et al. | |
| 2015/0003604 A1 | 1/2015 | McCormack et al. | |
| 2016/0021250 A1* | 1/2016 | Kumar | H04M 3/5166 |
| | | | 379/88.01 |
| 2016/0036977 A1* | 2/2016 | Chan | H04M 3/5238 |
| | | | 379/265.1 |
| 2017/0109757 A1* | 4/2017 | Tuchman | G06Q 30/0635 |
| 2020/0351403 A1 | 11/2020 | George et al. | |

OTHER PUBLICATIONS

Phung Hoang Joseph Nguyen; Office Action; U.S. Appl. No. 16/398,381; dated Dec. 1, 2020; United States Patent and Trademark Office; Alexandria, VA.

Phung Hoang Joseph Nguyen; Office Action; U.S. Appl. No. 16/398,381; dated Jul. 13, 2020; United States Patent and Trademark Office; Alexandria, VA.

* cited by examiner

INTERACTION BASED SUITABLE CHANNEL SELECTION FOR QUEUED CUSTOMERS

CROSS-REFERENCE TO RELATED APPLICATIONS

This application is a continuation of U.S. patent application Ser. No. 16/398,381 filed on Apr. 30, 2019, entitled "INTERACTION BASED SUITABLE CHANNEL SELECTION FOR QUEUED CUSTOMERS," which is hereby incorporated by reference in its entirety.

BACKGROUND

The present disclosure relates generally to a contact center environment, and, more particularly, to managing multi-channel interaction in a contact center.

Currently in omni-channel contact centers, there are many different channels such as audio, video, chat, SMS etc. available for the customers to use. Thus a customer may select a channel initially to begin an interaction with a contact center. Additionally, a contact center may have a website and try to show the waiting times of all channels on that website to show the response time customers can expect for each channel. But often, a customer may not be able to determine the most suitable channel for a specific problem for which they are contacting because the customer is not aware of the contact center agent skills or waiting time for specific queues. So though the estimated wait time for a particular channel on an average may be low, the customer might have used a less preferred channel for that issue that may have more waiting time because of less number of skilled agents on that channel.

BRIEF SUMMARY

One aspect of the present invention relates to a computer-implemented method in a contact center that includes receiving, by a computer of the contact center, an incoming contact via a first communication channel, the incoming contact assignable to a plurality of available communication channels; queuing, by the computer, the incoming contact in a first queue associated with the first communication channel; determining, by the computer, a preferable communication channel from among the plurality of communication channels and the first communication channel; and when the preferable communication channel is one of the plurality of communication channels, determining whether to assign the incoming contact to the preferable communication channel.

In accordance with this aspect, the method can also include assigning, by the computer, the incoming contact to the preferable communication channel; and after assigning the incoming contact with the preferable communication channel, moving, by the computer, the contact into a second queue associated with the preferable communication channel.

Furthermore, the method can include that before assigning the incoming contact to the preferable communication channel the computer informs a user device associated with the incoming contact about the preferable communication channel; receives an indication from the user device to change to the preferable communication channel or to remain assigned to the first communication channel and when the indication is to remain assigned to the first communication device the computer maintains assignment of the incoming contact to the first communication channel.

In accordance with this aspect the method can also include when the preferable communication channel is the first communication channel, maintaining assignment of the incoming contact to the first communication channel and transmitting to a user device associated with the incoming contact an indication that the first communication channel is the preferable communication channel.

In accordance with this aspect, the plurality of communication channels and the first communication channel comprise at least two of a short message service, a chat service, an audio channel, a video channel, a social media channel, or a web-based channel. Furthermore, the preferable communication channel can be determined based upon relative wait times associated with each of the first communication channel and the plurality of communication channels or can be determined based on capabilities of a plurality of agents available handle the incoming contact.

Further in accordance with this aspect, the method can include disconnecting the incoming contact from the first communication channel; and sending to a user device associated with the incoming contact a link to connect with the preferable communication channel.

Another aspect of the present invention relates to a system of a contact center that includes a memory device, storing executable instructions and a processor in communication with the memory device. In particular, the processor when executing the executable instructions receives an incoming contact via a first communication channel, the incoming contact assignable to a plurality of available communication channels; queues the incoming contact in a first queue associated with the first communication channel; determines a preferable communication channel from among the plurality of communication channels and the first communication channel; and when the preferable communication channel is one of the plurality of communication channels, determines whether to assign the incoming contact to the preferable communication channel or maintain assignment to the first communication channel.

In accordance with this aspect, the processor can also assign the incoming contact to the preferable communication channel; and after assigning the incoming contact with the preferable communication channel, move the contact into a second queue associated with the preferable communication channel.

Furthermore, the processor can, before assigning the incoming contact to the preferable communication channel, inform a user device associated with the incoming contact about the preferable communication channel; receive an indication from the user device to change to the preferable communication channel or to remain assigned to the first communication channel and when the indication is to remain assigned to the first communication device the processor maintains assignment of the incoming contact to the first communication channel.

In accordance with this aspect the processor can, when the preferable communication channel is the first communication channel, maintain assignment of the incoming contact to the first communication channel and transmit to a user device associated with the incoming contact an indication that the first communication channel is the preferable communication channel.

In accordance with this aspect, the plurality of communication channels and the first communication channel comprise at least two of a short message service, a chat service, an audio channel, a video channel, a social media channel, or a web-based channel. Furthermore, the preferable communication channel can be determined based upon relative wait times associated with each of the first communication channel and the plurality of communication channels or can be determined based on capabilities of a plurality of agents available to handle the incoming contact.

Further in accordance with this aspect, the processor can disconnect the incoming contact from the first communication channel; and send to a user device associated with the incoming contact a link to connect with the preferable communication channel.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

Figure 1:
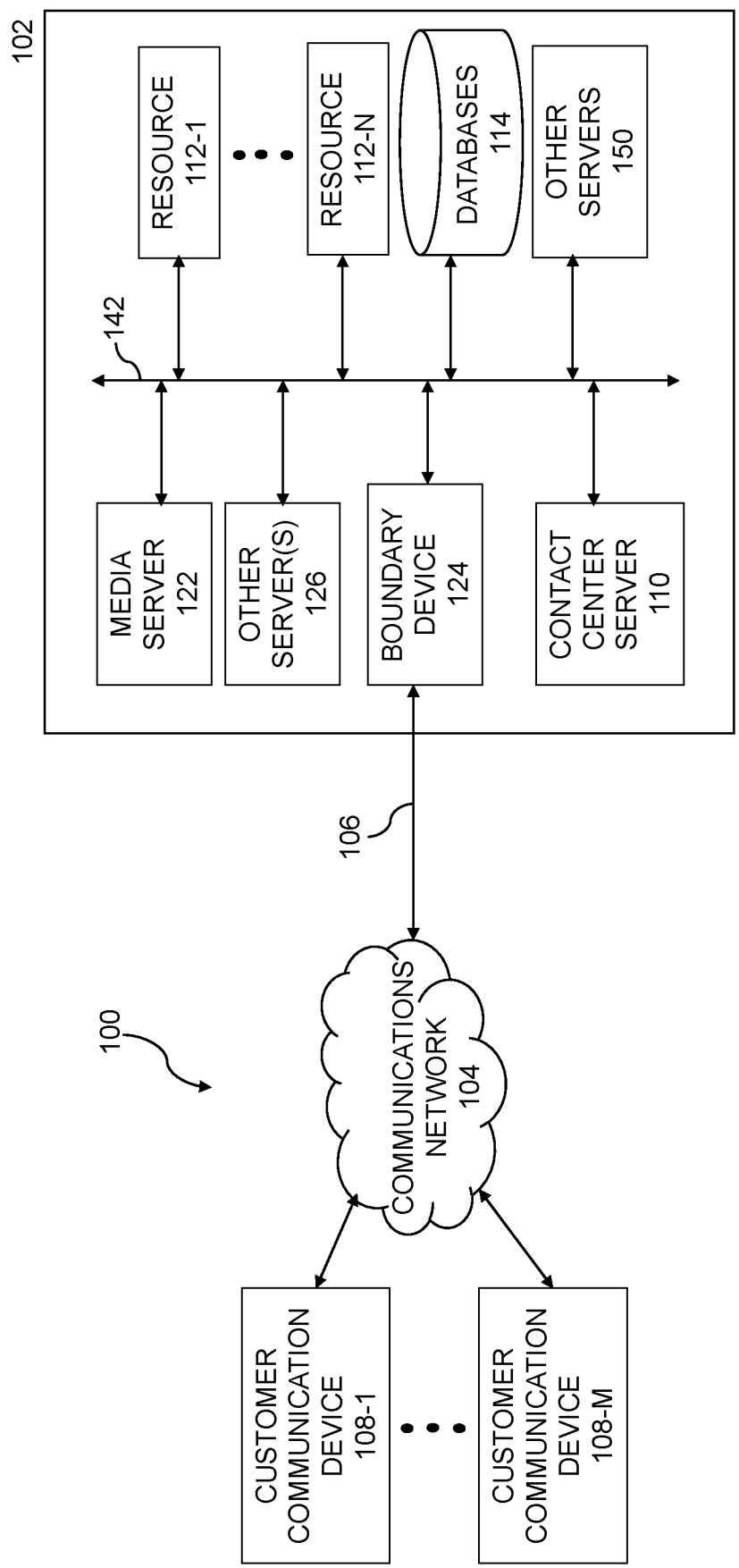
FIG. 1 and FIG. 2 provide an example contact center environment and are provided to illustrate a typical computer-based enterprise architecture in which embodiments in accordance with the present disclosure can be implemented.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In the present description, an "agent" and a "resource" can both be used to describe a person working at the contact center handling contacts. A contact center "customer" refers to a company or entity that has products and/or services for which the contact center provides support.

The term "computer readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communications may be by way of any communications medium such as, but not limited to, a telephone call, email, instant message, web chat, and the like. The terms "user" and "customer" denote a party external to the contact center and are used herein to refer to the other party to a contact or a communications session. A user or customer may include, for example, a person having a commercial relationship with the contact center or with a business represented by the contact center.

For each contact received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure may be separately claimed.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

Figure 2:
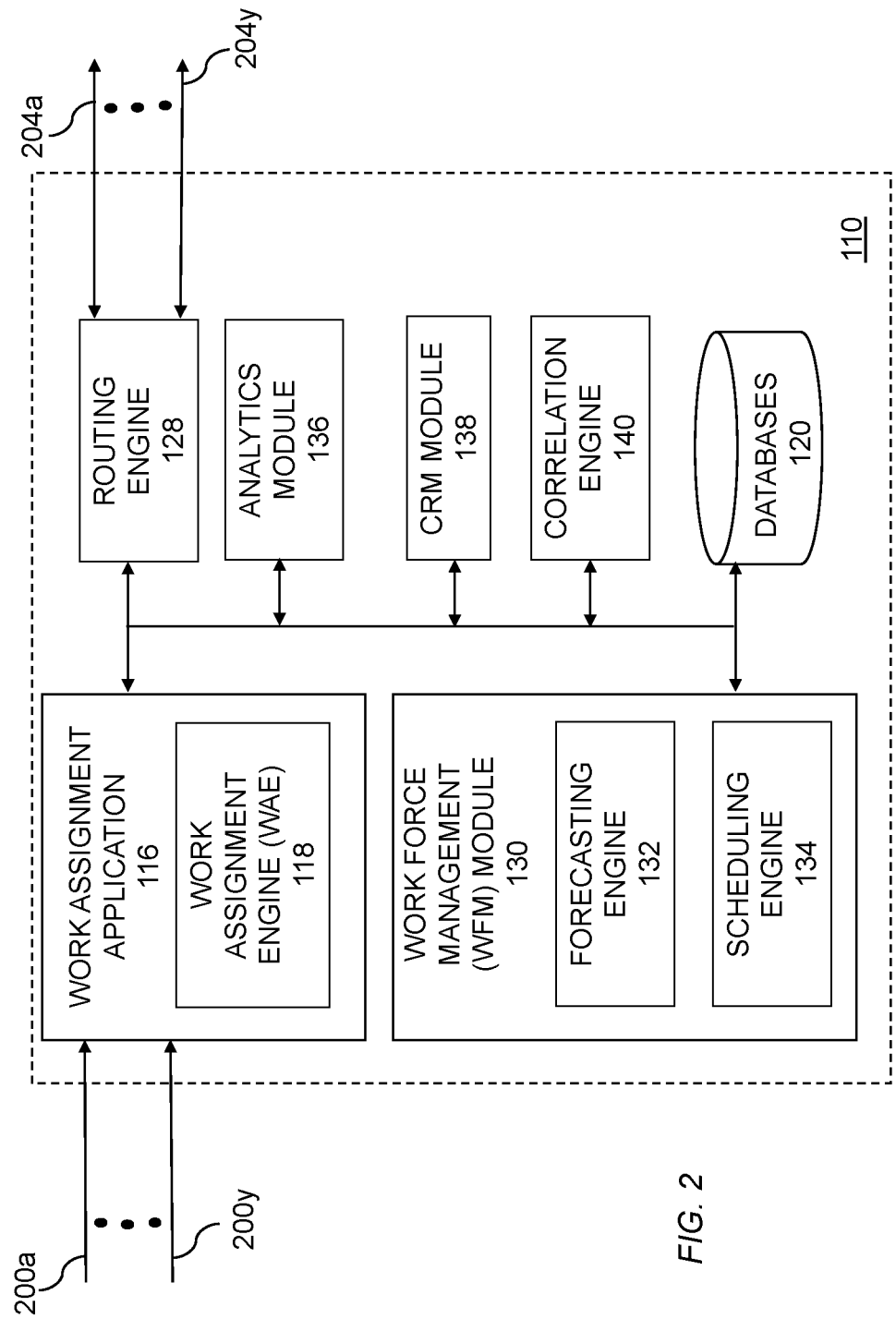

FIG. 1 and FIG. 2 provide an example contact center environment and are provided to illustrate a typical computer-based enterprise architecture in which embodiments in accordance with the present disclosure can be implemented.

FIG. 1 shows an exemplary embodiment of a communications system 100 according to the present disclosure. The communications system 100 may comprise a communications network 104 connecting components of a contact center 102 via a communications link 106 to one or more customer communication devices 108-1 to 108-M, where M is an integer, M≥1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communication medium or collection of communication media and may use any type of protocols to transport messages between endpoints. The communications network 104 may be packet-switched and/or circuit-switched and may include wired and/or wireless technologies.

The contact center 102 may comprise, for example, a boundary device 124, a central contact center server 110, a media server 122, one or more other servers 126, and a set of data stores or databases 114. The additional servers 126 may include, for example, an Interactive Response unit (IVR), a voice portal, a video call server, an email server, and the like. Some or all of the components of the contact center 102 may be interconnected by an internal network 142 such as a local area network (LAN) or WAN. One or more of the components of the contact center 102 may also be connected via one or more optional communications links (not shown) to one or more other components of the contact center 102.

Although depicted as separate servers and/or applications that are co-located with one another, it should be appreciated that such a configuration of components is not required. For example, some or all of the functions depicted in FIG. 1 may be co-hosted and/or co-resident on a single server and/or processor, e.g., the contact center server 110, and/or two or more of the contact center 102 components may be distributed and connected to one another over the communication network 104, with the communications between these components may be secured with tunneling protocols or a Virtual Private Network (VPN; not shown). In addition, although one central contact center server 110 is depicted in FIG. 1, two or more servers 110 may be provided in a single contact center 102 or across multiple separate LANs 142 owned and operated by a single enterprise, but separated by the communications network 154. Likewise, two or more media servers 122 may be provided in the contact center 102. In configurations where the contact center 102 includes two or more servers 110 and/or media servers 122, each server 110, 122 may comprise similar functionality, but may be provisioned for providing its features to only a subset of all contact center users.

A customer associated with a customer communication device 108 may utilize the device 108 to generate and transmit a communication, such as a telephone call, an email message, an instant message (IM), an SMS message, etc., over the communications network 104, which is received as a contact at the contact center 102. The contact may be received at the boundary device 124, which maintains a secure separation between the communication network 104 and the internal network 142 and facilitates communications between the customer communication device 108 and the contact center 102. The boundary device 124 may include the functionality of one or more of a switch, a computer-telephony integration (CTI) interface, a SIP gateway, a security gateway, a firewall, a router, or the like. A boundary device 124 comprising a SIP gateway may, for example, connect with one or more SIP trunks from the communications network 104 and split incoming aggregate SIP traffic into individual SIP sessions and aggregate the individual outbound SIP sessions. The boundary device 124 may be implemented as hardware such as via an adjunct processor (as shown) or as a chip in the contact center server 110 (not shown).

Following receipt at the contact center 102, a contact object is instantiated for each contact as described herein and the contact objects are distributed to a plurality of resources 112-1 to 112-N, wherein N is an integer, N≥1 (referred to collectively herein as resource 112). Each resource 112 represents a processing resource of the contact center 102 and may comprise completely automated resources (e.g., processors, servers, or the like), human resources utilizing communication devices (e.g., human agents utilizing a computer, telephone, laptop, etc.), or any other resource known to be used in a contact center 102. In some embodiments, contact objects may be assigned to the IVR (not separately labeled), a voice portal (not separately labeled), or other component of the contact center 102 for automated customer service processing prior to or simultaneous with assigning the contact object to a human resource (e.g., a contact center agent). For example, the voice portal and the IVR may work together to provide IVR services to the contacts.

Each resource 112 may be associated with a resource communication device (not shown), which may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communications device, and/or any other suitable communications device. These packet-switched devices may be SIP compatible. The resource communication device may also comprise circuit-switched devices that each correspond to one of a set of internal extensions and may include, for example, wired and wireless telephones, voice messaging and response units, traditional computer telephony adjuncts, and any other suitable communications device.

With reference to FIG. 2, the contact center server 110 may further comprise a work assignment application 116, a routing engine 128, a work force management (WFM) module 130, an analytics module 136, a customer relationship management (CRM) module 138, a correlation engine 140, and one or more database(s) 120. Although each of these functions is depicted in FIG. 2 as residing on the contact center server, it should be appreciated that one or more of the functions, such as the routing engine 128, may reside elsewhere and/or be executed by another server/engine.

Each contact object may comprise one or more work items and generally comprises at least a request for a resource 112. The format of each work item may depend upon the capabilities of the communication device 108 and the format of the communication. In particular, work items are logical representations within the contact center 102 of work to be performed in connection with servicing a particular contact received at the contact center 102 (and more specifically at the work assignment application 116). Work items may be received at the work assignment application 116 from the customer communication devices 108 via one or more customer communications lines or channels 200a to 200y (which may be one or more trunks, phone lines, etc.) and maintained at the work assignment application 116, a switch or server connected to the work assignment application 116, or the like until a resource 112 is assigned to the work item. As described below, the channels of the contact center can comprise multiple different mediums such that an interaction or contact may occur over multiple types of channels. The work assignment application 116 comprises a work assignment engine 118 that enables the work assignment application 116 to make intelligent routing decisions for work items. As used herein, assignment and/or routing of a contact or contact object to a resource and association of contact attributes with the contact or contact object are intended to be synonymous with assignment and/or routing of the work item(s) associated with the contact or contact object to a resource and association of contact attributes with the work item(s).

The work assignment engine 118 may determine which of the plurality of processing resources 112 is qualified and/or eligible to receive the work item and further determine which of the plurality of processing resources 112 is best suited to handle the processing needs of the work item. In situations of a work item surplus, the work assignment engine 118 may also determine an optimal assignment of a work item resource to a particular resource, e.g., resource 112-1. In some embodiments, the work assignment engine 118 may be configured to achieve true one-to-one matching by utilizing bitmaps/tables and other data structures. Following assignment of the resource 112-1 to a work item, the work assignment application 116 passes the work item to the routing engine 128 to connect the customer communication device 108 that initiated the communication with the assigned resource 112-1 via one of a plurality of resource communications lines 204a to 204y (which may be a voice-and-data transmission line such as a LAN 142 and/or a circuit switched voice line).

The WFM module 130 may be configured to manage the workforce of the contact center 102 (namely the human resources 112). The WFM module 130 may comprise a variety of functionalities, such as a forecasting engine 132 and a scheduling engine 134, that operate together to achieve optimal management of the workforce. The forecasting engine 132 may monitor current work item volume, current resource availability/utilization, past work item volume, past resource availability/utilization, estimated wait times, service levels, and other objectives and provides a forecast or estimate of the work item volume and required staffing levels in the contact center 102 for a desired shift period. For example, the forecasting engine 132 may be configured to monitor one or more Service Level Agreements (SLAs) between the contact center 102 and one or more clients or customers of the contact center 102 to ensure compliance with the applicable SLA(s).

The scheduling engine 134 uses the information provided by the forecasting engine to schedule human agents, e.g., resources 112, to work in the contact center 102. Additionally, the forecasting engine 132 may automatically identify future resource availability issues (in the short-term or long-term) and notify the scheduling engine 134, thereby enabling the scheduling engine 134 to adjust the scheduling of resources 112 as necessary. In some embodiments, the forecasting engine 132 is capable of analyzing prior and current contact center performance to determine if the contact center 102 will require more or less resources 112 at any particular time, e.g., the beginning or end of a calendar month. The scheduling engine 134 may also be configured to monitor schedule adherence, social media activity, and the like, and the WFM module 130 may enable shift bidding, schedule adjustments, work-at-home resource re-scheduling, and the like.

The analytics module 136 may be utilized to track trends and generate one or more reports that indicate agent performance and overall performance of the contact center 102. In some embodiments, the analytics module 136 may be configured to pull data stored in one or more databases 114, 120 and prepare the data in a human-readable format. The database(s) 114, 120 may be configured to store information about any or all components of the contact center 102 such as statistics related to the WFM module 130 (e.g., resource utilization, compliance with SLA agreements, compliance with objectives, etc.), resource performance statistics (e.g., Key Performance Indicators (KPIs)), and statistics related to the WAE 118 (e.g., decisions per time period, successful routing decisions, estimated wait time, etc.). Advantageously, the analytics module 136 may be configured to run one or more reports for predefined data automatically at predefined intervals. The analytics module 136 may also be enabled to run ad-hoc reports based on inputs received from a contact center administrator or manager. Further still, the analytics module 136 may be configured to run reports in response to a predetermined event or series of events occurring in the contact center 102.

The CRM module 138 may be configured to collect and manage historical customer information, current customer information, information related to interactions between a customer and a contact center 102, customer preferences, customer purchase history, customer return history, customer aliases (e.g., in social media networks), and the like. Such information may be stored and maintained in one or more of the database(s) 114, 120. The CRM module 138 may be utilized to help the contact center 102 provide a more robust and personalized customer service experience. In some embodiments, the CRM module 138 may retrieve desired CRM information from the database(s) 114, 120 to enable one of the resources 112 to more efficiently process a work item for a returning or known customer. For example, when a work item is received in a contact center 102 and the work item is associated with a customer having historical information stored as CRM information in one of the databases 114, 120, the CRM module 138 may retrieve some or all of the CRM information and provide the retrieved information to a resource 112, thereby enabling the resource 112 to provide a more personalized service to the customer.

In some embodiments, the contact center server 110 and its various functionalities may be configured to administer and make work assignment decisions in a queueless contact center, as described in U.S. Pat. No. 8,634,543, the entire contents of which is hereby incorporated herein by reference.

In other embodiments, the server 110 may be configured to execute work assignment decisions in a traditional queue-based (or skill-based) contact center, as described in U.S. Pat. No. 8,234,141, the entire contents of which is hereby incorporated herein by reference. Skill-based contact centers may maintain a resource profile, which includes information related to each resource's skills, level(s) of skill expertise, and training, as well as metrics associated with a plurality of work items serviced by the resource for each resource skill (e.g., contact type, duration, and resolution, ratings from the customer and/or a supervisor, etc.). The resource profiles may be stored, for example, in one or more contact center database(s) (e.g., 114, 120 in FIGS. 1 and 2). This resource information is used to assign each resource to one or more skill groups or resource queues (not shown). When a new contact is received at a skill-based contact center, information about the contact is determined, such as the customer's identity and current needs, customer value, and the resource skill that is required for the proper handling of the contact, and this information, along with additional data such as current contact center queue lengths, is used to assign each new contact to a work item queue (not shown). Some of the information related to the one contact may be maintained in a customer profile, which may also be stored, for example, in one or more contact center database(s) (e.g., 114, 120 in FIGS. 1 and 2). Contacts are assigned to resources based on a comparison of the resource skill required to service the contact and the skillset(s) of each resource. Other servers and applications 150 may also be provided within the contact center.

In further embodiments, the server 110 and its various functionalities are configured to execute work assignment decisions in an attribute-based contact center, such as a contact center using the Avaya Oceana™ Solution. Similar to a skill-based contact center, attribute-based contact centers gather information about customers and assign each contact to a resource based on matching between customer and resource data. However, attribute-based matching provides a match based on a plurality of individual attributes of the contact and the resource, as opposed to matching based on a single "skill" assigned to the contact in a traditional skill-based setting. Attribute-based matching provides more details about the contacts and delivers a greater degree of granularity than traditional skill-based matching, which permits more accurate forecasting of future needs.

As shown in FIG. 2, the contact center management system 128 can incorporate a processor 130 which manages several records and subsystems required to operate the contact center 110 in a known manner, including a record of available agent resources 132, a queue management subsystem 134, a workflow management subsystem 136 (which determine the steps involved in treating a contact such as routing to IVR 122, allocation to a queue 134, and allocation to an available agent 120), and a dynamically updated contact record 138 of contacts which are currently live at the contact center. The latter record may also include historical records of contacts which have been terminated. The processor 130 has access to a memory 140 as part of an overall implementation within a computer system.

Returning to FIG. 1, the contact center 110 can thus operate in a conventional mode, receiving contacts from users outside the contact center, such as a contact from a mobile phone 142 via a cellular phone network connected to the Internet 114, or a contact from a computer user 146 (who may communicate using telephony, instant messaging, email, interaction with a web server, or in any other suitable manner), or from telephone callers 148,150 connected to the PSTN 116 or to the Internet 114.

When a contact is received at the gateway 112, a new contact record is created in the contact record area 138, and the contact center management system 128 can then route the communications session associated with the contact to the various resources of the contact center 110 in accordance with the workflows 136, such as by using an IVR session 122 to deduce the nature of the contact and the skillsets required to handle it, allocating the contact to a suitable queue 134, and when an agent 120 is available to handle the contact, placing the agent in communication with the contact. The contact center 110 will also generally incorporate further components which are conventional and typical such as a call recording mechanism, conferencing mechanisms, supervisor functionality, statistics and records, etc., none of which are shown for conciseness.

Currently in omni-channel contact centers, there are many different channels such as audio, video, chat, SMS etc. available for the customers to use. Thus, a customer may select a channel initially to begin an interaction with a contact center. Additionally, a contact center may have a website and try to show the waiting times of all channels on that website to show the response time customers can expect for each channel. But often, a customer may not be able to determine the most suitable channel for a specific problem for which they are contacting because the customer is not aware of the contact center agent skills, or waiting time for specific queues. So though the estimated wait time for a particular channel on an average may be low, the customer might have used a less preferred channel for that issue that may have more waiting time because of a lesser number of skilled agents on that channel.

For example, in one scenario, a customer may make a call to the contact center via one of multiple available communication channels. However, the context history collected by the contact center may indicate that similar queries have been answered more satisfactorily via an alternate channel than the one the customer selected. For example, the alternate, or preferable, channel may have better skilled agents available for this particular query at that moment or may have a relatively less waiting time on that particular channel. Conventionally, even in those instances, the interaction with the contact center will likely proceed with the channel through which the customer initiated the contact. As such, the contact may result in a) the contact not being provided with the best channel, from amongst the plurality of available channels, to resolve the query, b) the context information not being used to the fullest extent to resolve the customer's issue, c) the customer experiencing a greater-than-needed waiting time, or d) the customer engaging an agent other than a better skilled agent available on another channel.

Channel selection in an omni-channel environment can take into account factors such as the current call context, the best available skilled agent available to answer the query across the different channels, the average wait time for all available channels at that moment, or the best channel which has resolved similar queries in the past. Embodiments in accordance with the principles of the present disclosure consider one or more of those identified factors when determining whether or not to assign an incoming contact to a communication channel different than the one the customer may have initially selected and to which the incoming contact was already queued.

So, determining the preferable or best channel based on a query or contact context wherein the customer's query can be resolved most satisfactorily by a best skilled available agent at that particular point of time (across the multiple available channels) with minimal or no waiting time and at the same time, from the contact center perspective, utilize the agent's time most efficiently is beneficial over conventional techniques for handling a contact that arrives (and is queued) via one communication channel from among a plurality of available communication channels.

Embodiments in accordance with the principles of the present disclosure contemplate determining a preferable or best suitable channel dynamically for handling an interaction when a customer contacts a contact center using a first communication channel such that the customer is on a queued state, in a queue associated with the first communication channel, and before the customer starts interacting with an agent on the first channel.

In the case of an omni-channel contact center with various channels available, the computer system, or server, of the contact center is in a position to determine how the customer query can be resolved in a preferable or best possible way by considering a combination of various factors. The contact center server can determine the most suitable channel, from among a plurality of available communication channels, for a customer interaction in which the customer has initially selected a first communication channel for the interaction. Using the queuing and channel selection techniques described above with respect to the contact server and work assignment engine, the incoming contact can be assigned to one of the available communication channels.

When a customer calls or contacts a contact center via their preferred channel, the contact center computer can evaluate various factors related to that interaction to determine if there may be a different channel that is preferable to which the contact may be assigned. By way of example, some of the factors that may be evaluated include a) the current call context, b) the customer's chosen channel, c) the capabilities of the calling device of the customer (e.g., landline, smartphone, computer, etc.), d) the best available skilled agent available to answer the query across the different channels (this can be determined based on historical customer comments and/or performance metrics collected by the contact center), e) the average wait time for all available channels at that moment, and f) the best channel which has resolved similar queries in the past (again, this can be determined from past customer surveys or from quality metrics collected by the contact center such as first-call resolution, call resolution time, and customer feedback).

As an example, the context of the call can provide an appropriate reason as to why the customer has called. The context can be derived from the IVR prompt responses given by the customer or can also be derived with ASR techniques where, for example, the customer could be directly asked for what issue they have called. Thus, the context can help the contact center computer to determine the reason for the call and attributes of the call. That will help to map the current call to more appropriate skills and agents and hence the channel can be selected by the contact center computer based on availability of those skills and agents.

Based on the above factors, the contact center computer can, after collecting initial information about the customer and the customer's query, determine a preferable communication channel for the customer and suggest the best or preferable channel to have the query resolved, both satisfactorily and/or in a minimum possible time. Here the customer will be queued initially in a queue associated with the first channel that the customer uses to contact the contact center but may be moved, by the contact center computer, or assigned to a second communication channel that is preferable for handling the customer's query. Assigning the contact to a different channel may occur automatically without requiring consent of the customer. However, in some embodiments, the customer is informed of the second, preferable channel and asked whether or not they would like their contact or query to be assigned to that preferable channel. When a customer's contact or query is assigned to the second or preferable communication channel, then that contact is moved so as to be queued in a queue that is associated with the second communication channel. In that process, the contact may be de-queued from the first queue to which it was assigned by the work assignment engine or an application with similar functionality.

For determining a current call or contact context, interactive voice response (IVR) prompts or automated speech recognition (ASR) techniques can be used. For communication channels other than a voice call, equivalent techniques can be used to analyze the initial context of the contact to determine the nature of the customer and the customer's query. Once the mandatory inputs are ready the contact center server can start the calculations which will determine the suitable or preferable channel for the customer's query. One of ordinary skill will recognize that there are many different factors that can be considered and that each factor can be given a different level of importance (or weight). Thus, the factors can be combined in various ways to create a score or value that is indicative of which channel may be a preferred or best channel to which a customer's query or contact should be assigned. Furthermore, the different available channels can each be assigned a score or value so that a ranked list of channels can be generated. The customer can be presented with the ranked list, a portion of the ranked list, or just the preferred channel and asked whether or not they would like to be assigned to a different channel than the one they initially selected for contacting the contact center.

By way of example, and not intended to limit embodiments of the present invention, to determine a preferable channel the contact center server can consider factors, such as:

a) Current call context—e.g., query of amount debited from the account, but beneficiary account not credited (as mentioned above, the context can be derived, for example, by using ASR (Automatic speech recognition) techniques where the customer directly mentions the abstract of the issue when prompted by the system. For example, a customer may say "I made a deposit two days ago but it appears not to have been credited yet". In response, the contact center server can look for the skills or agents who have handled similar issues in the past;

b) Customer chosen channel—e.g., video;

c) Capabilities of the calling device of the customer.— Smart phone which is capable of both audio and video as opposed to a conventional landline, for example, capable of only audio (thus, the contact center server can avoid identifying a channel for which the calling device might not have capabilities to handle);

d) Best available skilled agent available to answer the query across the different channels—e.g., based on historical contact center metrics the agent for this query is available via the audio channel;

e) Average wait time for all available channels at that moment—e.g., the shortest projected or estimated wait time is the audio channel (each channel can be ranked from shortest to longest wait time); and f) Based on historical contact center metrics, which channel has most effectively resolved similar queries in the past (each channel can be ranked from most effective to least effective).

Based on a combination of one or more of the above factors, a customer initially queued based on the channel with which they contacted the contact center can be provided with queue announcements asking if they would like to switch to a preferable channel (e.g., do they want to switch from a video channel to an audio channel) for this call or contact.

Once the customer agrees to switch the channel, signaling methods within the contact center server can be used to switch the channel. For example, changes in SDP properties can be used to switch in between audio and video. As known to one of ordinary skill in the art, SDP refers to session description protocol and is part of SIP messaging. SDP is used to advertise details about a media stream during VOIP calls initialization. So, in this instance, by using SDP headers in the SIP INVITE/REINVITE, contact center server can change the channel like audio to video etc. If the first channel that the customer used and the preferable or best channel that the customer subsequently selects use different protocols like audio and chat, then the contact center server can disconnect the first channel and send the customer, for example, a web chat link to the customer's smart phone.

In some instances. the preferred channel and customer's initially selected channel may be the same. If so, the call or contact can continue on the same channel as usual and if desired the customer can be given, by the contact center server, an indication that they have called on the best suitable channel for the issue or context of their query. Doing so provides the customer with confidence that their query is being handled in an efficient manner.

In addition to voice, audio, chat, SMS, and web based communication channels, by way of other examples, the customer's initially selected channel (or the determined preferable communication channel) can include use of Multimedia Messaging Services (MMS) and/or Rich Communication Services (RCS) such as messages from social media networks (e.g., Twitter, Facebook, WhatsApp, kik, etc.). As one example, an incoming contact or query may arrive via one of these channels to typically be routed to an automated bot that uses artificial intelligence to attempt to handle the contact. In some instances in which the bot is unable to satisfactorily answer the customer's question(s), the contact center server can select a different, preferable communication channel in which a live agent can participate, such as an audio call, video call, or other type of messaging service. For example, the automated bot can ask the customer for contact information with which the live agent can initiate contact with the customer using a different communication channel. Alternatively, the original communication channel may be maintained but the live agent is added into the communication channel to replace the automated bot. As described herein, the changing of the channel assignment may be performed automatically or the customer may be presented with a choice of available channels to select from in order to have some control of how the contact is reassigned to another communication channel.

Figure 3:
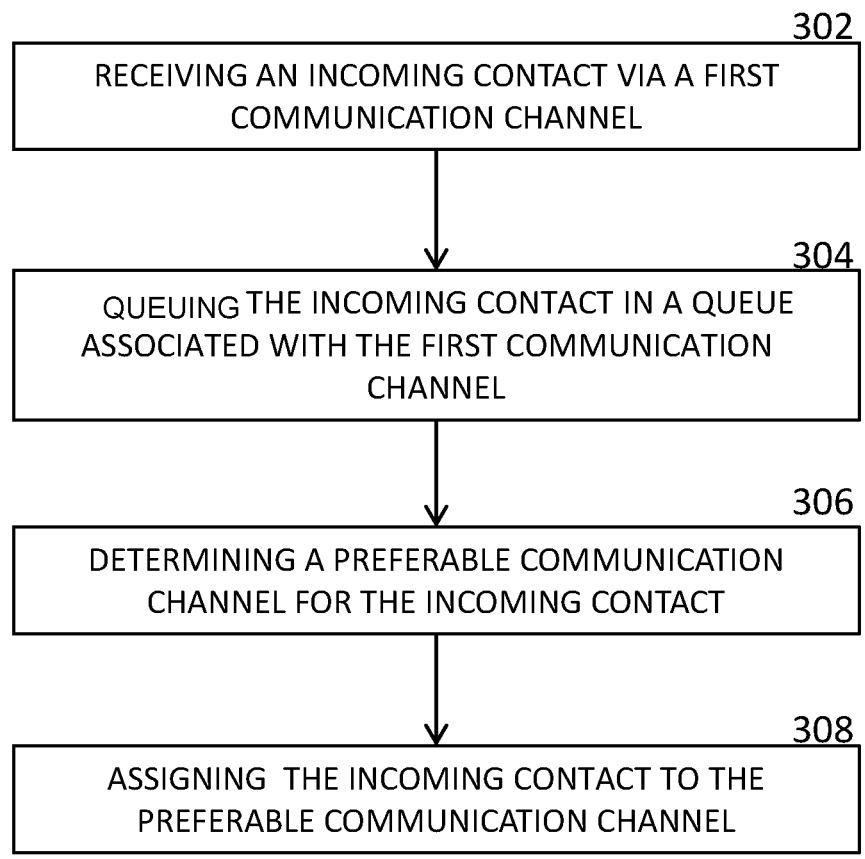
FIG. 3 is a flowchart of an example method to manage contacts in an omni-channel environment in accordance with the principles of the present disclosure.

FIG. 3 is a flowchart of an example method to manage contacts in an omni-channel environment in accordance with the principles of the present disclosure. The flowchart depicts a computer-implemented method in a contact center that begins, in step 302, with a computer of the contact center receiving an incoming contact via a first communication channel, wherein, because the contact center is an omni-channel contact center, the incoming contact is assignable to a plurality of available communication channels. However, initially in step 304, the computer queues the incoming contact in a first queue associated with the first communication channel. As explained above, the contact center server has a number of different queues in which a contact may be queued. In particular, each available communication channel in the omni-channel contact center may have its own respective, associated queue in which contacts for that particular channel can be queued when the contact is assigned to that communication channel.

Even though the contact is initially queued in the queue associated with the first communication channel, the contact center computer or server can determine, in step 306, a preferable communication channel from among the plurality of communication channels and the first communication channel. As explained above, a number of factors can be used to determine which communication channel in the omni-channel contact center is preferable as compared to the other channels. A contact center computer can be programmed to assign weights to different factors such that for some contact centers a shortest wait time may be more important than the best available agent or the (historically) most effective channel. To help in this determination, the contact center computer can collect context-related information about the customer, the communications mode of the customer, and the subject of the customer's query. Regardless of the precise manner in which the factors are considered and weighted, the contact center computer determines if the first communication channel or one of the other available communication channels is preferable for the incoming contact. Thus, in some instances the respective capabilities of the agents that are currently available (or will be available in a predetermined time period) to handle a contact may be used to determine which channel to assign or re-assign the contact to and in other instances the channel with the shortest estimated wait time is used to determine which channel to assign or re-assign the contact to.

In step 308, the contact center computer determines, when the preferable communication channel is one of the plurality of communication channels other than the first communication channel, whether to assign the incoming contact to the preferable communication channel. As mentioned above, the contact center computer may automatically assign the contact to the preferable communication channel and move the contact into a queue associated with that preferable communication channel. However, the contact center computer may, alternatively, provide an announcement to the customer that informs the customer, via a customer device, that a different communication channel is preferable over the first communication channel and inquires from the customer whether or not the customer would like to be assigned to the preferable communication channel. If the customer agrees, then the contact can be assigned and queued to the preferable communication channel. Otherwise, the contact can remain assigned and queued with the first communication channel.

In some instances, the first communication channel may also be the preferable communication channel. Thus, the contact center computer can transmit to a user device associated with the incoming contact an indication that the first communication channel is the preferable communication channel. By way of example, the plurality of communication channels and the first communication channel can include at least two of a short message service, a chat service, an audio channel, a video channel, a social media channel, or a web-based channel.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer-implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A computer-implemented method in a contact center, comprising:
    receiving, by a computer of the contact center, an incoming contact from a customer via a first communication channel, wherein the incoming contact is assignable to a plurality of available communication channels;
    queueing, by the computer, the incoming contact in a first queue associated with the first communication channel;
    receiving, by the computer, contextual information associated with the incoming contact;
    after queuing the incoming contact in the first queue, determining, by the computer, based on the contextual information associated with the incoming contact, a preferable communication channel from among the plurality of communication channels and the first communication channel;
    transmitting, by the computer, to a user device associated with the incoming contact, an indication of the preferable communication channel; and
    receiving, by the computer, from the user device, an indication to change to the preferable communication channel or to remain assigned to the first communication channel.

2. The method of claim 1, wherein the contextual information comprises current contextual information associated with the customer.

3. The method of claim 2, wherein the current contextual information comprises at least one of an identity of the customer, a reason for the incoming contact, or one or more agent skills required to handle the incoming contact.

4. The method of claim 1, wherein the contextual information comprises historical contextual information associated with the customer from one or more previous contacts with the contact center.

5. The method of claim 1, further comprising:
    receiving, by the computer, historical contextual information associated with at least one different customer from one or more previous contacts with the contact center,
    wherein the preferable communication channel is further determined based on the historical contextual information.

6. The method of claim 5, wherein:
    the contextual information comprises a query associated with the incoming contact;
    at least one previous contact among the one or more previous contacts is associated with a similar query; and
    the historical contextual information comprises contact center metrics associated with the at least one previous contact, the contact center metrics comprising at least one of a communication channel or an agent associated with the at least one previous contact.

7. The method of claim 1, further comprising:
    receiving, by the computer, additional information associated with at least one of the incoming contact or the contact center, wherein the additional information comprises at least one of:
        one or more communication capabilities of the user device, a relative wait time associated with each of the plurality of communication channels and the first communication channel, and one or more skills of a plurality of agents available to handle the incoming contact, wherein the preferable communication channel is further determined based on the additional information.

8. The method of claim 1, further comprising:

switching, by the computer, the incoming contact to the preferable communication channel when the indication from the user device indicates that the customer chooses to be assigned to the preferable communication channel; and moving, by the computer, the contact into a second queue associated with the preferable communication channel.

9. The method of claim 1, further comprising:

maintaining, by the computer, an assignment of the incoming contact to the first communication channel when the indication from the user device indicates that the customer chooses to remain assigned to the first communication channel.

10. The method of claim 1, wherein determining the preferable communication channel occurs prior to the customer being connected to an agent associated with the first queue.

11. A system of a contact center comprising:

a memory device, storing executable instructions;

a processor in communication with the memory device, the processor when executing the executable instructions:

receives an incoming contact from a customer via a first communication channel, wherein the incoming contact is assignable to a plurality of available communication channels;

queues the incoming contact in a first queue associated with the first communication channel;

receives contextual information associated with the incoming contact;

after queuing the incoming contact in the first queue, determines, based on the contextual information associated with the incoming contact, a preferable communication channel from among the plurality of communication channels and the first communication channel;

transmits, to a user device associated with the incoming contact, an indication of the preferable communication channel; and receives, from the user device, an indication to change to the preferable communication channel or to remain assigned to the first communication channel.

12. The system of claim 11, wherein the contextual information comprises current contextual information associated with the customer.

13. The system of claim 12, wherein the current contextual information comprises at least one of an identity of the customer, a reason for the incoming contact, or one or more agent skills required to handle the incoming contact.

14. The system of claim 11, wherein the contextual information comprises historical contextual information associated with the customer from one or more previous contacts with the contact center.

15. The system of claim 11, wherein the processor when executing the executable instructions, further:

receives historical contextual information associated with at least one different customer from one or more previous contacts with the contact center, wherein the preferable communication channel is further determined based on the historical contextual information.

16. The system of claim 15, wherein:

the contextual information comprises a query associated with the incoming contact;

at least one previous contact among the one or more previous contacts is associated with a similar query; and the historical contextual information comprises contact center metrics associated with the at least one previous contact, the contact center metrics comprising at least one of a communication channel or an agent associated with the at least one previous contact.

17. The system of claim 11, wherein the processor when executing the executable instructions, further:

receives additional information associated with at least one of the incoming contact or the contact center, wherein the additional information comprises at least one of:

one or more communication capabilities of the user device, a relative wait time associated with each of the plurality of communication channels and the first communication channel, and one or more skills of a plurality of agents available to handle the incoming contact, wherein the preferable communication channel is further determined based on the additional information.

18. The system of claim 11, wherein the processor when executing the executable instructions, further:

switches the incoming contact to the preferable communication channel when the indication from the user device indicates that the customer chooses to be assigned to the preferable communication channel; and moves the contact into a second queue associated with the preferable communication channel.

19. The system of claim 11, wherein the processor when executing the executable instructions, further:

maintains an assignment of the incoming contact to the first communication channel when the indication from the user device indicates that the customer chooses to remain assigned to the first communication channel.

20. The system of claim 11, wherein determining the preferable communication channel occurs prior to the customer being connected to an agent associated with the first queue.

* * * * *